July 6, 1926.
S. B. REDFIELD
1,591,343
SEALING DEVICE FOR WRIST PINS
Filed March 31, 1926
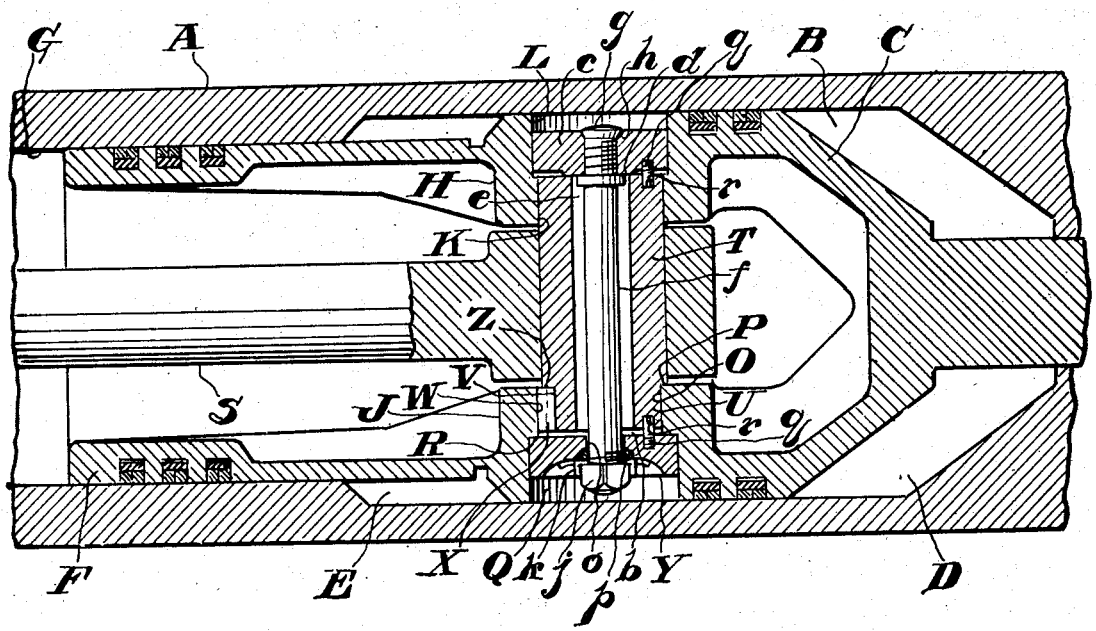
INVENTOR
Snowden B. Redfield
BY
HIS ATTORNEY Patented July 6, 1926.

1,591,343

UNITED STATES PATENT OFFICE.

SNOWDEN B. REDFIELD, OF EASTON, PENNSYLVANIA, ASSIGNOR TO INGERSOLL-RAND COMPANY, OF JERSEY CITY, NEW JERSEY, A CORPORATION OF NEW JERSEY.

SEALING DEVICE FOR WRIST PINS.

Application filed March 31, 1926. Serial No. 98,822.

This invention relates to wrist pins, but more particularly to a sealing device for wrist pins.

The objects of the invention are to prevent pressure fluid from leaking between the wrist pin and associated parts and to enable a wrist pin to be securely clamped in a piston in a simplified and novel manner without distorting the piston.

Other objects will be in part obvious and in part pointed out hereinafter.

The invention consists of the combination of elements and arrangements of parts substantially as hereinafter described and more particularly pointed out in the appended claims and illustrated in the accompanying drawing, in which The figure is a longitudinal view in section of a cylinder, a piston therefor, and a connecting rod connected to the piston by a wrist pin constructed in accordance with the practice of the invention.

Referring more particularly to the drawing, A indicates a cylinder having a chamber B within which chamber is arranged a piston C. The piston C in this instance divides the chamber B into a low pressure chamber D at one end and at the other end a high pressure chamber E and is provided with a skirt F which cooperates with a bore G formed coaxially with the chamber B for guiding the piston and for sealing the chamber E. The parts so far described form no part of the present invention and are merely shown for illustrative purposes and it is to be understood that the invention is not confined to any particular type of piston.

The piston C in this instance is provided with the usual inwardly extending opposed bosses H and J. Formed in the boss H is a bore K terminating at its outer end in an enlarged recess L. In like manner a bore O is formed in the boss J concentrically with the bore K, but of somewhat smaller diameter than the bore K to form a shoulder P on the inner face of the boss J. The outer end of the bore O is preferably enlarged as at Q to form a shoulder R for a purpose to be more fully described hereinafter.

Disposed within the bores K and O to connect a connecting rod S operatively to the piston C is a wrist pin T having a reduced portion U. Both the reduced portion U and the enlarged portion of the wrist pin are of diameters to cooperate snugly with the bores O and K respectively for the purpose of preventing any leakage of pressure fluid between the contacting surfaces.

Suitable means are provided for preventing relative rotation between the wrist pin T and the piston C. To this end a key slot V is formed in the reduced portion U to coincide with a similar key slot W formed in the boss J for the reception of a key X.

As is well known in devices of this character, in which means such as keys or other similar elements are used for locking the wrist pin against rotation in the piston, considerable loss of pressure fluid is caused due to leakage through the key slots. To prevent such leakage in the present disclosure, a washer Y is inserted in the recess Q and cooperates with the shoulder R to form a fluid tight joint therebetween. A shoulder Z on the wrist pin T abuts the shoulder P of the boss J to limit endwise movement of the wrist pin in one direction and also serves to retain the key X in the key slots. In the present instance, the reduced portion U of the wrist pin T is slightly shorter than the bore O so that a slight space $b$ exists between the wrist pin T and the washer Y. Suitable means are also provided for sealing the opposite or large end of the wrist pin T. To this end a cap $c$ is inserted in the recess L and has a bearing surface $d$ preferably of reduced diameter to cooperate with the end of the wrist pin T for preventing admission of pressure fluid into a bore $e$ of the wrist pin.

In order that the cap $c$ may be held firmly against the wrist pin T and that the washer Y may be pressed tightly against the shoulder R, a bolt $f$ projecting through the bore $e$ of the wrist pin is screwed into the cap $c$ and is held against accidental removal therefrom in any suitable manner, as for instance, by riveting or piening the end $g$ of the bolt into a counter bore $h$ formed in the outer face of the cap. The opposite end of the bolt $f$ extends loosely through the washer Y and is screw threaded to receive a nut $j$ which, in the present instance, is held against removal by a lock washer $k$. In this way the wrist pin is also held against longitudinal movement in the piston. In order that the bolt $f$ may readily adjust its position so that the face $d$ of the cap $c$ may contact fully with the end of the wrist pin T, a bore $o$ in the washer Y through which the bolt extends is of somewhat larger diameter than the bolt and leakage of pressure fluid through the bore *o* is preferably prevented by a suitable compressible gasket *p* arranged about the bolt *f* underneath the lock washer *k*.

Any suitable means may be provided for preventing relative rotation between the cap *c* and the wrist pin and also between the washer Y and the wrist pin T. In the present instance this is accomplished by screwing headless set screws *q* into the cap *c* and the washer Y and permitting the free ends of the set screws to extend into recesses *r* formed in the ends of the wrist pin T. These set screws may be removed whenever it is desired to regrind the contacting faces of the wrist pin T, the washer Y and the cap *c*.

The present invention has been found to function in an unusually satisfactory manner. By means of the construction hereinbefore described, leakage of pressure fluid through the wrist pin and its securing means is entirely eliminated. A further advantageous feature of the present invention is that the clamping element whereby the pin is held against longitudinal movement acts only against one boss or side of the piston, thus preventing distortion of the piston.

I claim:

1. In combination with a piston having a bore and a connecting rod, of opposed shoulders near one end of the bore, a hollow wrist pin in the bore to connect the connecting rod with the piston, a shoulder on said wrist pin to cooperate with one of the shoulders in the bore, a cap seated on one end of the wrist pin to prevent leakage of pressure fluid through the said wrist pin, a washer at the other end of the wrist pin to cooperate with the other shoulder in the bore for sealing the other end of the wrist pin, and a bolt for clamping the washer and the shoulder on the wrist pin firmly against the opposed shoulders in the bore and for holding the cap in fluid tight contact with the wrist pin.

2. In combination with a piston having a bore and a connecting rod, of an inner shoulder and an outer shoulder near one end of the bore, a hollow wrist pin in the bore to connect the connecting rod with the piston, a shoulder on said wrist pin to abut the inner shoulder, key slots in the wrist pin and in the bore, a key inserted in said slots for preventing relative rotation between the wrist pin and the piston, a cap on one end of the wrist pin to prevent leakage of pressure fluid through the wrist pin, a washer at the other end of the wrist pin to cooperate with the outer shoulder for preventing leakage of pressure fluid through the key slots into the interior of the piston, said washer being spaced from the wrist pin, and a bolt for clamping the washer against the outer shoulder and the shoulder on the wrist pin against the inner shoulder and for clamping the cap against the wrist pin.

In testimony whereof I have signed this specification.

SNOWDEN B. REDFIELD.